(12) United States Patent
Arita

(10) Patent No.: US 8,127,456 B2
(45) Date of Patent: Mar. 6, 2012

(54) APPARATUS AND METHOD FOR CUTTING RUBBER PORTION OF CONVEYER BELT

(75) Inventor: Katsuo Arita, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 357 days.

(21) Appl. No.: 12/229,495

(22) Filed: Feb. 13, 2007

(65) Prior Publication Data

US 2009/0013539 A1    Jan. 15, 2009

Related U.S. Application Data

(63) Continuation of application No. 10/469,187, filed as application No. PCT/JP02/01612 on Feb. 22, 2002, now Pat. No. 7,200,939.

(30) Foreign Application Priority Data

Feb. 26, 2001 (JP) .................................. 2001-49706

(51) Int. Cl.
*B26B 3/00* (2006.01)

(52) U.S. Cl. ................ 30/314; 30/90.1; 30/294; 83/614

(58) Field of Classification Search .................... 83/835, 83/614, 651.1, 569, 578, 455; 30/92, 92.5, 30/91.2, 90.1, 314, 294; 81/9.4, 9.41–9.43; 29/564.4, 565, 566

See application file for complete search history.

(56) References Cited

U.S. PATENT DOCUMENTS

| | | |
|---|---|---|
| 1,572,304 A | 2/1926 | Morton |
| 3,137,192 A | 6/1964 | McNeil |
| 3,981,215 A | 9/1976 | Granger et al. |
| 4,435,555 A * | 3/1984 | Loffelman et al. ........... 526/261 |
| 4,920,644 A | 5/1990 | LaGattuta |
| 5,085,114 A | 2/1992 | DeRoss et al. |
| 5,256,496 A * | 10/1993 | Kluczynski .................. 428/661 |
| 5,967,012 A * | 10/1999 | Dummer et al. ................ 83/451 |

FOREIGN PATENT DOCUMENTS

| | | |
|---|---|---|
| DE | 39 37 043 A1 | 12/1990 |
| DE | 44 09 438 C1 | 7/1995 |
| EP | 0 867 126 A1 | 9/1998 |
| JP | 46-39614 B | 11/1971 |
| JP | 62-54696 A | 3/1987 |
| JP | 63-267193 A | 11/1988 |
| JP | 2-31694 U | 2/1990 |
| JP | 2000-225617 A | 8/2000 |
| RO | 116 890 B1 | 7/2001 |

* cited by examiner

*Primary Examiner* — Phong Nguyen
(74) *Attorney, Agent, or Firm* — Sughrue Mion, PLLC

(57) ABSTRACT

An apparatus and method for cutting a rubber portion of conveyer belt using a splitting member having a triple blade consisting of a V-shaped thin blade and a V-shaped double holder blade, in which the V-shaped thin blade is disposed within the V-shaped double holder blade so as to protrude from the V-shaped double holder blade, and a cutting member having a cylindrical blade consisting of two straight thin blades and two semicylinder blades, and a double holder, where the straight thin blades are disposed within the semicylinder blades so as to protrude from both side edges of the semicylinder blades, and the double holder is disposed so as to attach to the straight thin blades and to have the cylindrical blade replaceable therefrom.

4 Claims, 11 Drawing Sheets

FIG. 1A
FIG. 1B
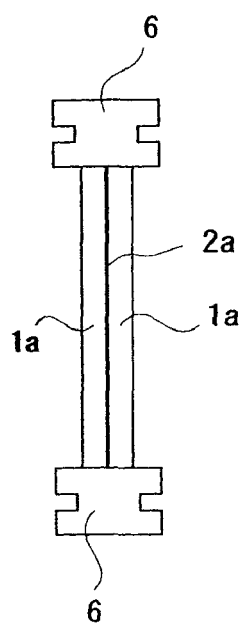
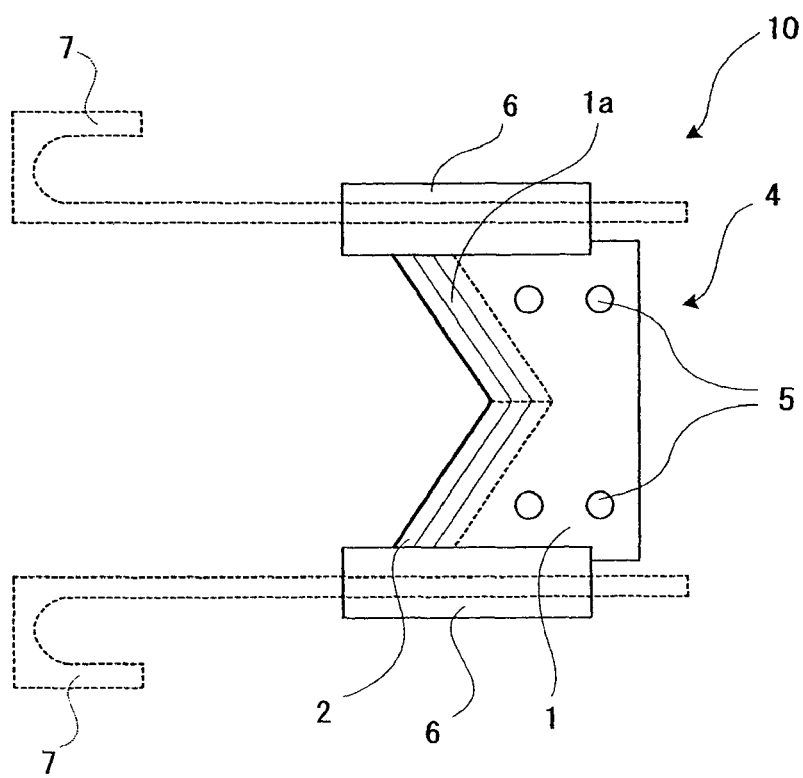

APPARATUS AND METHOD FOR CUTTING RUBBER PORTION OF CONVEYER BELT

This is a continuation of application Ser. No. 10/469,187 filed Aug. 26, 2003 now U.S. Pat. No. 7,200,939, which is a National Stage Entry under 35 U.S.C. §371 of PCT/JP02/01612 filed Feb. 22, 2002. The entire disclosure of the prior applications, U.S. Ser. No. 10/469,187 and PCT/JP02/01612, is hereby incorporated by reference.

TECHNICAL FIELD

The present invention relates to an apparatus and a process for cutting a rubber portion of conveyer belt. Specifically, the present invention relates to an apparatus and a method, which cut a rubber portion of a conveyer belt positioned between each steel cords embedded therein so as to separate the steel cords, and cut off the rubber portion efficiently and completely from the separated steel cords.

BACKGROUND ART

When endless joining is applied to a conveyer belt, in the practice of the ordinary art, it is necessary to strip off all the steel cords embedded in the conveyer belt at both terminals of the conveyer belt with a predetermined length.

Conventionally, under cover rubber and upper cover rubber of the belt that is clamped at a predetermined place are manually removed by using a knife. Thereafter, bonding rubber portions positioned between each steel cords are vertically cut by using a knife or the electric heating cutter disclosed in Japanese Patent Application Publication (JP-B) No. 46-39614, and then the bonding rubber portion around each steel cords are cut off by using a knife.

As each operation in the above-mentioned three steps has been manually carried out using existing tools in conventional art, therefore, operation efficiency could not be achieved. For example, the work man-hour of 8 people×16 hours is required to strip all the steel cords off from the conveyer belt by using knives, where the width of the belt is 1,800 mm, the embedded steel cords are 11.0 mm (diameter)× 110 (number), and thickness of cover rubber is 16 mm×8 mm.

Moreover, the cutting operation of rubber using knives is a hard labor and causes considerable fatigues. Furthermore, only skilled workers can successfully carry out the cutting operation of rubber by using knives. Since it is extremely difficult to remove rubber portions completely and uniformly from entire length of steel cords, as mentioned above, irregularity of the rubber portion is remained around steel cords in practices. Consequently, problems arise in that numerous man-hour is also required in a modifying operation during a molding step, which is performed later.

There is also a problem in that either repeated grinding of blade or replacement of blade is required and surface strands of steel cords are easily damaged, all because the blade edge has extensive contacts with steel cords during the cutting operation of rubber portion.

In the case of performing the cutting operation of rubber portion using the electric heating cutter disclosed JP-B No. 46-39614 in which the blade having U-shape in elevation is disposed, cutting resistance causes deformation of the heated U-shaped blade, and this deformation and the like lead to failure in cutting a bonding rubber portion at a very early stage.

In order to overcome the above-mentioned problems, inventors of the present invention suggest, as shown in FIGS. 14A to 14C, the apparatus for cutting a rubber portion of conveyer belt "40" disposing a cylindrical blade part "41" and straight blade parts "42", in JP-A 63-267193. In the apparatus, the straight blade parts "42", "42" are disposed both ends of the cylindrical blade part 41 so as to have the straight blade parts "42", "42" protrude from the cylindrical blade part "41", and the cylindrical blade part "41" is configured to surround a steel cord embedded in a conveyer belt.

This suggested apparatus realizes a cutting operation, which cut off rubber portions completely and uniformly from a predetermined length of steel cords, without any skills and with only a little man-hour. Moreover, the apparatus enables to prevent damages on surface strands of the steel cords.

However, the apparatus disclosed in JP-A 63-267193 still has problems to be solved. To be specific, the cylindrical blade part "41", the straight blade parts "42", "42", and brackets "43a", "43b" are disposed forming an integral construction (including an integration by rivets). When only one of the cylindrical blade part and the straight blade parts has impaired sharpness or is damaged, therefore, the whole integral construction is required to be replaced. Generally, the straight blade parts needs to be grinded more frequently compared with the cylindrical blade part. As a consequence, it is inefficient in its operation and cost.

Additionally, cutting resistance becomes large because of the integral construction of the cylindrical blade part "41" and the straight blade part "42" as shown in FIGS. 14A to 14C. Especially in the case that thick, high strength steel cords having a diameter of 9 mm to 13 mm, which are embedded in a conveyer belt, the blade edge of the cylindrical blade prone to lean towards traveling direction thereof. This leads the blade edge to contact with a steel cord, hence, the steel cord may be damaged.

Further, the apparatus for cutting a rubber portion "40" does not accommodate a member for controlling twist (curvature) of the conveyer belt, which is to be cut, by drawbar pull during cutting, therefore the blades receive extra cutting resistance and this results in rapid wear of blades. As a double blade of cutting blades and bracket parts "43a" and "43b" is secured only by rivets, moreover, edge of the cylindrical blade part "41" is widen by drawbar pull when cutting. Consequently, there is a problem in that diameters of the cut cylindrical steel cords vary.

Under these circumstances, the present invention aims at solving conventional problems and achieving following tasks.

Namely, it is an object of the present invention to provide an apparatus and method for cutting a rubber portion of conveyer belt, which are suitable for cutting a rubber portion positioned between each steel cords embedded therein so as to separate each steel cords, and cut off the rubber portion completely and uniformly from each steel cords at predetermined length.

DISCLOSURE OF INVENTION

The first aspect of the apparatus for cutting a rubber portion of conveyer belt of the present invention comprises a splitting member having a triple blade. The triple blade consists of a V-shaped thin blade and a V-shaped double holder blade, in which the V-shaped thin blade is disposed within the V-shaped double holder blade so as to protrude from the V-shaped double holder blade. Moreover, the apparatus for cutting is used for splitting a rubber portion of a conveyer belt so as to separate each steel cords embedded in the conveyer belt, and cutting the rubber portion off from the separated steel cords so as to strip the steel cords, where the splitting member is used for splitting the rubber portion.

According to the first aspect of the apparatus for cutting a rubber portion of conveyer belt of the present invention, cutting performance (edge sharpness) is significantly excellent and thin blades can be easily replaced by utilizing commercially available, inexpensive, thin blades. Consequently, even if the blade edge is impaired its sharpness, grinding of the blade edge is not necessity. Moreover, utilizing the V-shaped blade prevents a conveyer belt to offset in a vertical direction hence the splitting operation can carried out smoothly.

The second aspect of the apparatus for cutting a rubber portion of conveyer belt comprises a cutting member having a cylindrical blade consisting of two straight thin blades and two semicylinder blades, and a double holder. The straight thin blades are disposed between the semicylinder blades so as to protrude from both side edges of the semicylinder blades, and the double holder is disposed so as to attach to the straight thin blades and to have the cylindrical blade replaceable therefrom. Moreover, the apparatus for cutting is used for splitting a rubber portion of a conveyer belt so as to separate each steel cords embedded in the conveyer belt, and cutting the rubber portion off from the separated steel cords so as to strip the steel cords, where the cutting member is used for cutting the rubber portion off.

According to the second aspect of the apparatus for cutting a rubber portion of conveyer belt of the present invention, non-integral construction of the cylindrical blade, which surrounds a steel cord, and the double holder realize easy maintenance of blades. When the blade is worn, therefore, only the cylindrical blade can be replaced with a spare blade and then the cutting operation can be continuously carried out.

The third aspect of the apparatus for cutting a rubber portion of conveyer belt of the present invention, comprises arms having rails thereon and disposed both upper and under sides with respect to a conveyer belt to be cut; a plurality of movable rollers disposed to the arms so as to nip the conveyer belt from both upper and under sides; and the splitting member used in the first aspect of the present invention for splitting the conveyer belt so as to separate each steel cords embedded therein. Moreover, the arms have a wedge-shaped cutout portion so as to dispose the splitting member therein.

The fourth aspect of the apparatus for cutting a rubber portion of conveyer belt of the present invention, comprises arms having rails thereon and disposed both upper and under sides with respect to a conveyer belt to be cut; a plurality of movable rollers disposed to the arms so as to nip the conveyer belt from both upper and under sides; the cutting member used in the second aspect of the present invention for cutting the rubber portion off from the separated steel cords so as to strip the steel cords. Moreover, the arms have a wedge-shaped cutout portion so as to dispose the cutting member therein.

According to the third and fourth aspects of the apparatus for cutting a rubber portion of conveyer belt of the present invention, nipping (sandwiching) a conveyer belt by a plural of movable rollers, enables the splitting or cutting member to adjust to a sense of the conveyer belt even which is twisted during splitting or cutting, and wear of blade edge at an early stage can be reduced.

The method for cutting a rubber portion of a conveyer belt of the present invention comprises the step of splitting a rubber portion of conveyer belt positioned between each steel cords embedded therein using the splitting member as in the first aspect of the present invention, so as to separate steel cords; and a step of cutting the rubber portion off from the separated steel cords using the cutting member as in the second aspect of the present invention, so as to strip the steel cords.

As a result of using this method, frequent maintenances can be reduced, the cutting operation can be efficiently carried out, and the number of operation process can also be reduced.

According to the present invention, consequently, a rubber portion around each steel cords can be almost completely, and efficiently uniformly removed without any skill, and man-hour of medication operation in later processes. Especially, even if the object to be cut is a conveyer belt embedding thick, strong steel cords, i.e., the diameter of 9 mm to 13 mm, reduction in cutting resistance and efficiency of the cutting operation can be realized by splitting the conveyer belt using a vertical cut dedicated blade so as to separate each steel cords, and thereafter, cutting the rubber portion off from the separated steel cords using a cylindrical blade.

BRIEF DESCRIPTION OF DRAWINGS

FIG. 1A is an elevation view, and FIG. 1B is a side view, both showing an example of the apparatus for cutting a rubber portion of conveyer belt of the present invention.

BEST MODE FOR CARRYING OUT THE INVENTION

The present invention will be precisely explained referring to the figures hereinafter.

<The First Aspect of Apparatus for Cutting Rubber Portion of Conveyer Belt>

FIGS. 1A and 1B each show an elevation view and schematic side view of an example of the first aspect of the apparatus for cutting a rubber portion of conveyer belt of the present invention. This apparatus for cutting "10" is mainly utilized for splitting the rubber portion of the conveyer belt so as to separate each steel cords embedded in the rubber portion.

Figure 2:
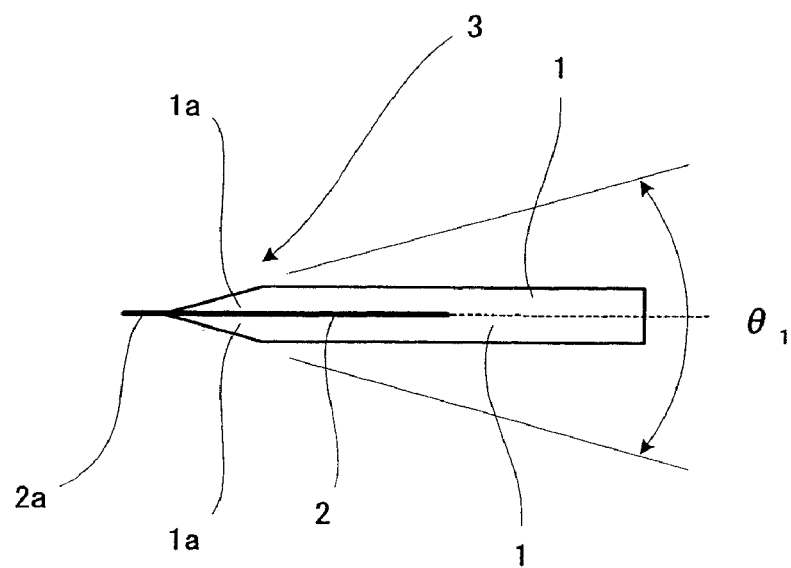
FIG. 2 is an enlarged view of blade edges showing in FIGS. 1A and 1B.
Figure 3:
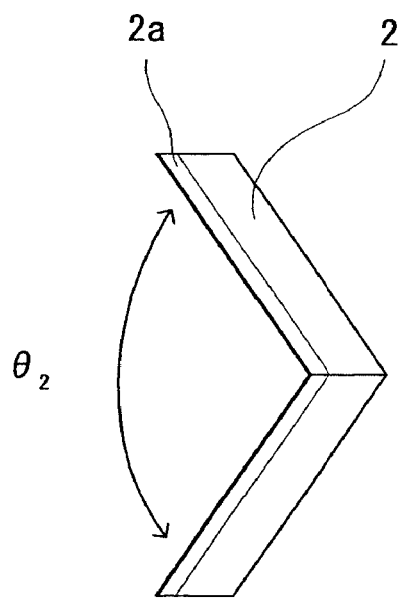
FIG. 3 is a side view showing an example of V-shaped thin blade.

As shown in FIGS. 1A, 1B and 2, the apparatus for cutting "10" equips the splitting member "4" having the triple blade "3" in which the V-shaped thin blade "2" is disposed within the V-shaped double holder blade "1", "1" so as to protrude from the V-shaped double holder blade.

The V-shaped thin blade "2" between the V-shaped double holder blade "1", "1" is secured by tightening the V-shaped double holder blade "1", "1" using a plural of screws "5", hence the triple blade "3" are formed as shown in FIG. 2. The total included angle $\theta_1$ of the triple blade "3" is preferably within a range of 50° to 70°, and more preferably 60°. By adjusting the total included angle as in the above, cutting resistance of conveyer belt is reduced and rectilinear splitting is ensured.

The blade edge of the V-shaped thin blade "2a" protrudes from the blade edges of the V-shaped double holder blade "1a", "1a" at 3 mm or longer, preferably 5 mm. Further, the V-shaped double holder blade "1", "1" is formed of tool steel such as SK, SKS, SKD, SKH or the like, or other sufficiently rigid steel products.

The V-shaped thin blade "2" has preferably a V-shaped angle $\theta_2$ of 110° to 130°, and more preferably 120°. As a thin blade having the above-mentioned V-shape angle, commercially available, inexpensive, parallelogram blades can be used in combination.

The triple blade "3" is mounted from both side edges of the double holder blade "1" by the mounting members "6", "6", and secured so that the V-shaped blade part is touched with the rubber portion positioned between each steel cords embedded in the rubber portion of conveyer belt, as shown in FIGS. 1A and 1B. In addition, the hooks "7", "7" are provided at one end of the mounting members "6", "6", as shown in FIG. 1B, so as to be able to hang wire, chain or the like thereon, though these are not shown in FIG. 1B.

Figure 4:
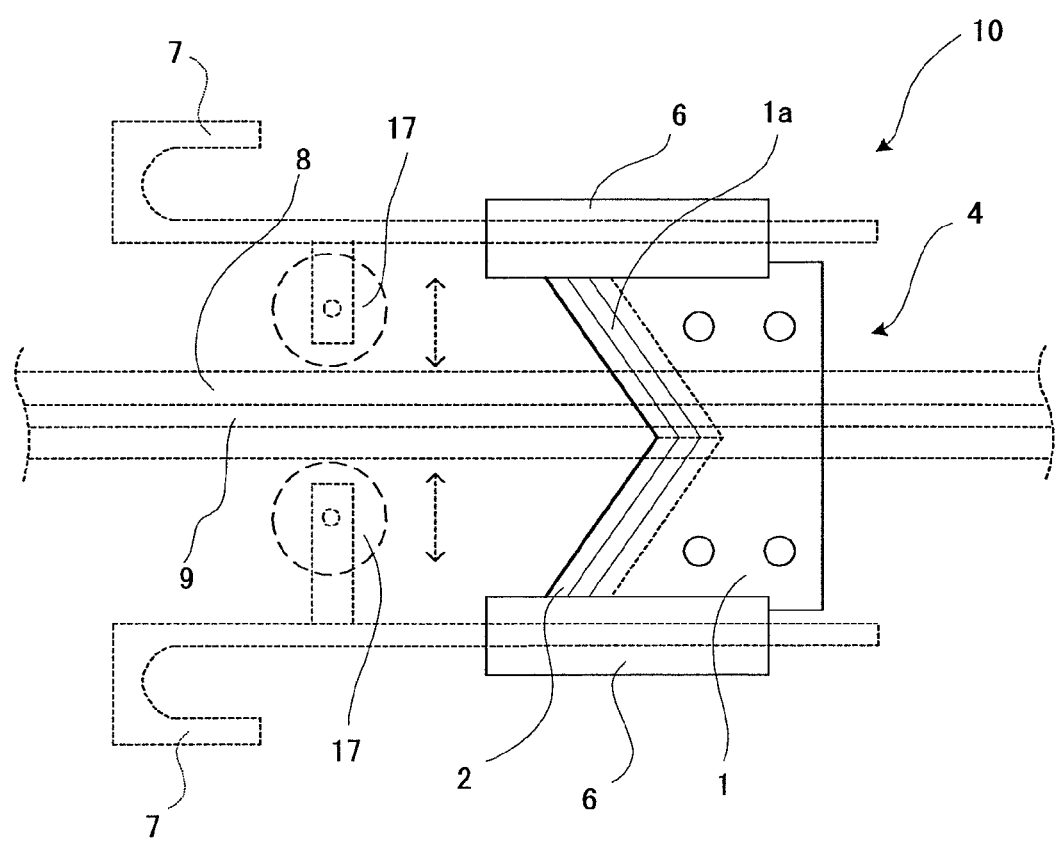
FIG. 4 is a side view showing a modification example of FIGS. 1A and 1B.

Moreover, the apparatus for cutting "10" equips a plurality of movable rollers "17", "17" positioned between the hooks "7", "7", and the object to be cut (conveyer belt) "8", as shown in FIG. 4. The movable rollers "17", "17" are disposed upper side and under side with respect to the object to be cut (conveyer belt) "8" so as to nip the object to be cut (conveyer belt) "8" by the movable rollers "17", "17".

In this way, even if the conveyer belt "8" is twisted or curved during splitting, the movable rollers "17", "17" bounce with the direction of the arrow shown in FIG. 4, and the splitting member "4" can adjust with the shape of the conveyer belt. Therefore, cutting resistance and wear of blade edge can be reduced.

According to the first aspect of the apparatus for cutting a rubber portion of conveyer belt of the present invention, a ruined blade can easily be replaced hence frequency grinding of blade edge is not required. By forming blade edge in a V-shape, the object to be cut tends not to offset in vertical direction during splitting. Even in the case that the object to be cut offsets, a rubber portion positioned between each steel cords can be split smoothly and steadily. As the first aspect of the apparatus for cutting is dedicated to use of splitting a rubber portion positioned between each steel cords, thick, strong steel cords do not damage a blade edge, and the steel cords are not damaged by the blade edge, hence the splitting operation can be smoothly carried out.

<The Second Aspect of Apparatus for Cutting Rubber Portion of Conveyer Belt>

Figure 5:
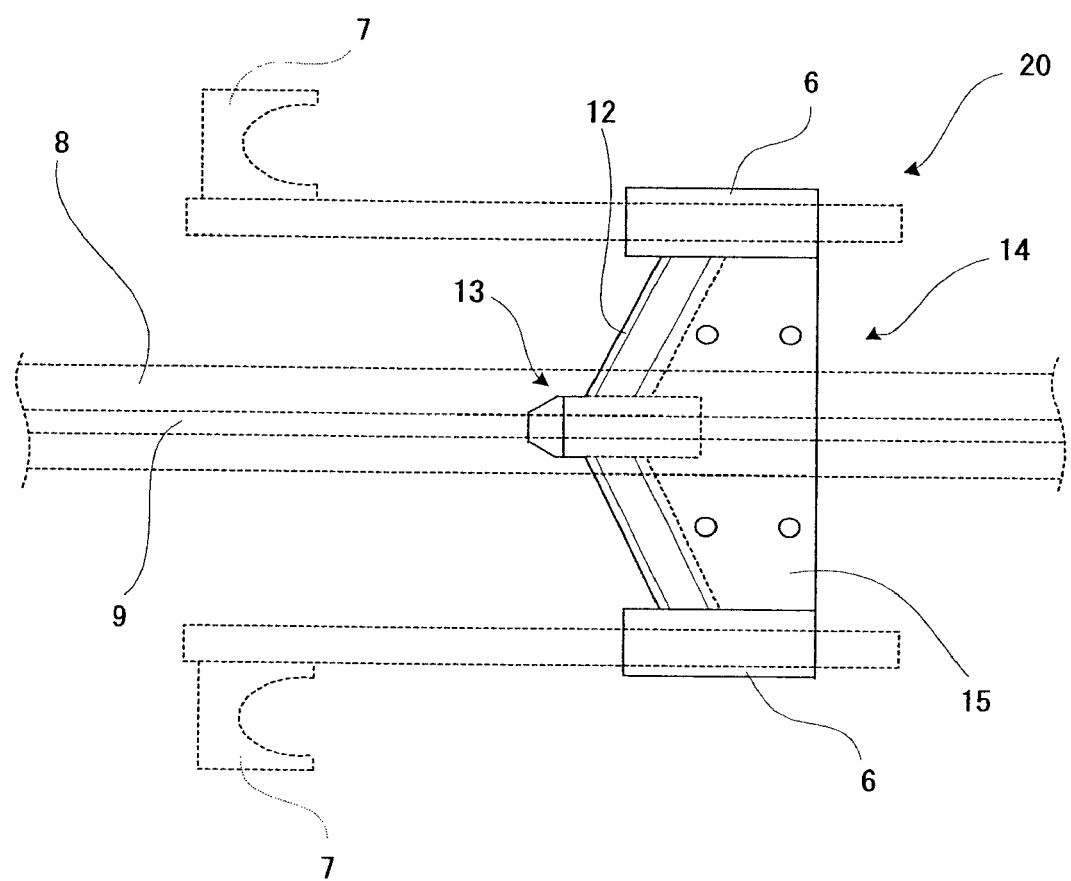
FIG. 5 is a side view showing an example of the apparatus for cutting a rubber portion of conveyer belt of the present invention.
Figure 6A:
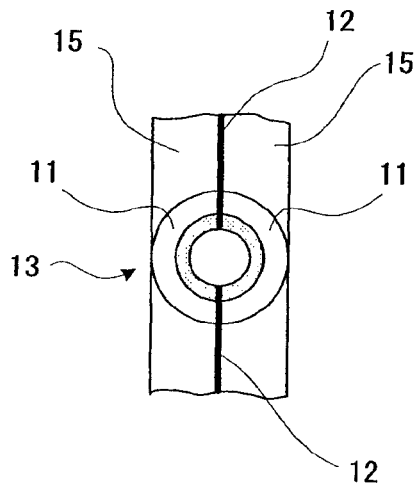
FIG. 6A is an elevation view of blade part showing in FIG. 5
Figure 6B:
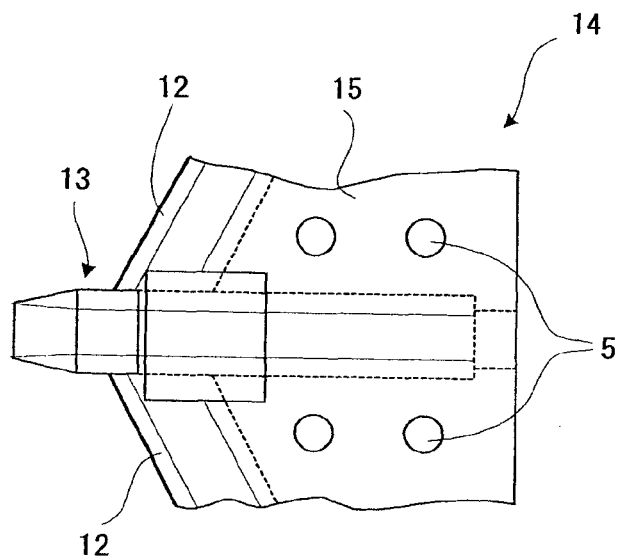
FIG. 6B is an enlarged side view of blade part showing in FIG. 5.
Figure 7:
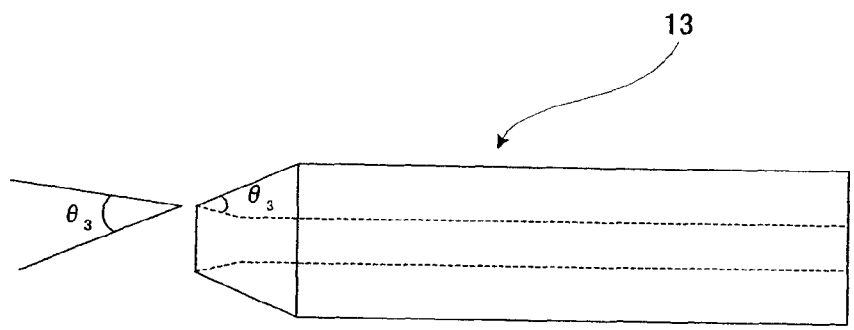
FIG. 7 is a side view showing cylindrical blade of FIG. 5.

FIG. 5 shows an example of a side view of the second aspect of the apparatus for cutting a rubber portion of conveyer belt "20" of the present invention. FIGS. 6A and 6B are enlarged views of the blade part, and FIG. 7 is a partial enlarged view of the cylindrical blade "13". This apparatus for cutting "20" is mainly utilized for cutting the rubber portion off from the separated steel cords.

As shown in FIGS. 6A and 6B, the apparatus for cutting "20" equips the cutting apparatus "14", in which the cylindrical blade "13" is disposed in the double holder "15", "15". In the cylindrical blade "13", the straight thin blades "12", "12" are disposed between the semicylinder blades. Moreover, the double holder "15", "15", is disposed so as to attach to the straight thin blades. Further, the cylindrical blade is formed of tool steel such as SK, SKS, SKD, SKH or the like, or other sufficiently rigid steel products.

The cylindrical blade "13", which surrounds a steel cord, disposed in the double holder, is secured by tightening the double holder "15", "15" using a plural of screws "5", so that the cylindrical blade is replaceable.

The included angle $\theta_3$ of the cylindrical blade "13" is preferably within a range of 25° to 35°, and more preferably within a range of 25° to 30°, as shown in FIG. 7.

The straight thin blades "12", "12" are disposed with an angle so as to gradually retract in the cylindrical blade "13" in the vertical direction and to be replaceable. As such straight thin blades, commercially available, inexpensive, parallelogram blades can be used. Depending on the cases, the straight thin blade "12" can be omitted.

The cutting member "14" is mounted by the mounting members "6", "6" from both side edges of the straight thin blades "12" so that the cylindrical blade "13" surrounds each steel cords, as shown in FIG. 5. In addition, the hooks "7", "7" are provided at one end of the mounting members "6", "6", and wire, chain or the like can be hanged from the front, though these are not shown in figures.

Figure 8:
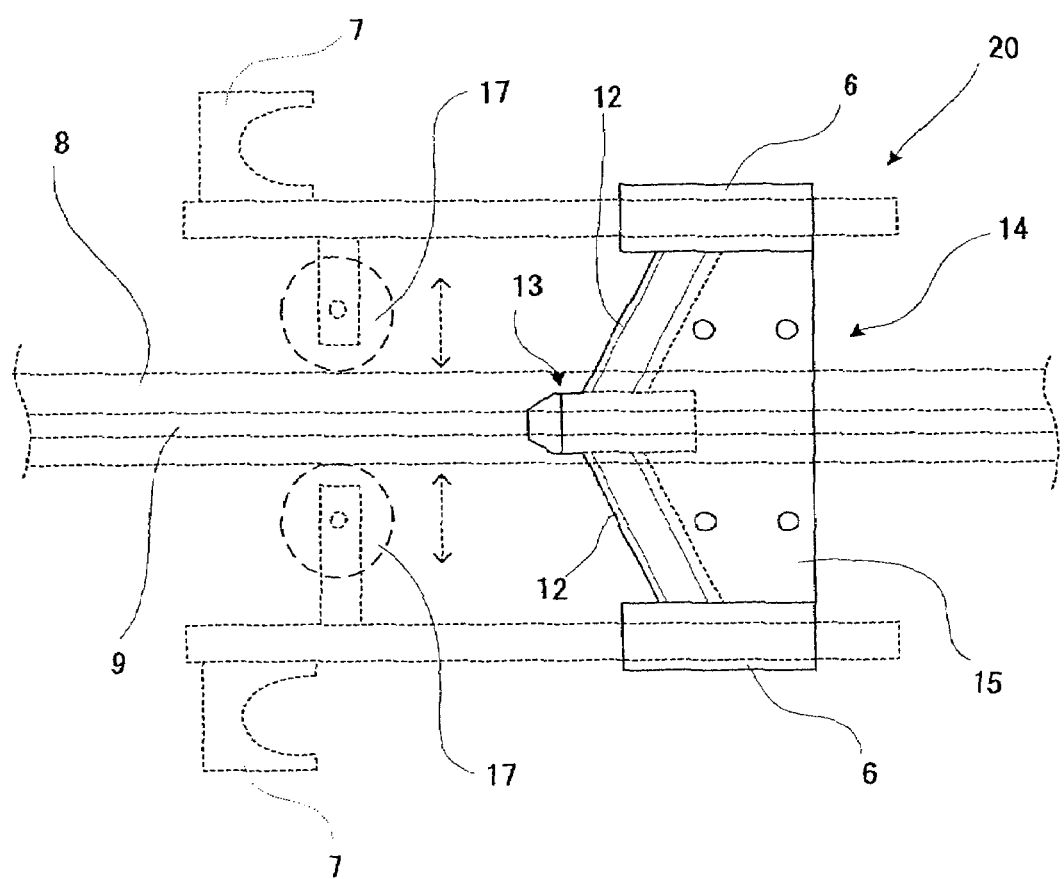
FIG. 8 is a side view showing a modified example of the apparatus for cutting a rubber portion of conveyer belt of FIG. 5.

Moreover, the apparatus for cutting "20" equips a plurality of movable rollers "17", "17" positioned between the hooks "7", "7", and the object to be cut (conveyer belt) "8", as shown in FIG. 8. The movable rollers "17", "17" are disposed upper side and under side with respect to the object to be cut (conveyer belt) "8" so as to nip the object to be cut (conveyer belt) "8" by the rollers "17", "17".

In this way, even if the conveyer belt "8" is twisted or curved during cutting, the movable rollers "17", "17" bounce with the direction of the arrow shown in FIG. 8, and the cutting member "14" can adjust with the shape of the conveyer belt. Therefore, cutting resistance and wear of blade edge can be reduced.

According to the second aspect of the apparatus for cutting a rubber portion of conveyer belt of the present invention, non-integral construction of the cylindrical blade, which surrounds a steel cord, and the double holder realize easy maintenance of blades. When the cutting blade is worn, therefore, only the cylindrical blade can be replaced with a spare blade and then the cutting operation can be continuously carried out. As the second aspect of the apparatus for cutting is dedicated to use of cutting off a rubber portion from steel cords, thick, strong steel cords do not damage a blade edge, and the steel cords are not damaged by the blade edge, hence the cutting operation can be carried out smoothly.

<The Third and Fourth Aspects of Apparatus for Cutting Rubber Portion of Conveyer Belt>

In the third and fourth aspects of the apparatus for cutting a rubber portion of conveyer belt of the present invention, arms having rail ways thereon are disposed upper side and under side with respect to a conveyer belt which is an object to be cut, and the splitting member of the first aspect or the cutting member of the second aspects is disposed to the arms.

Figure 9A:
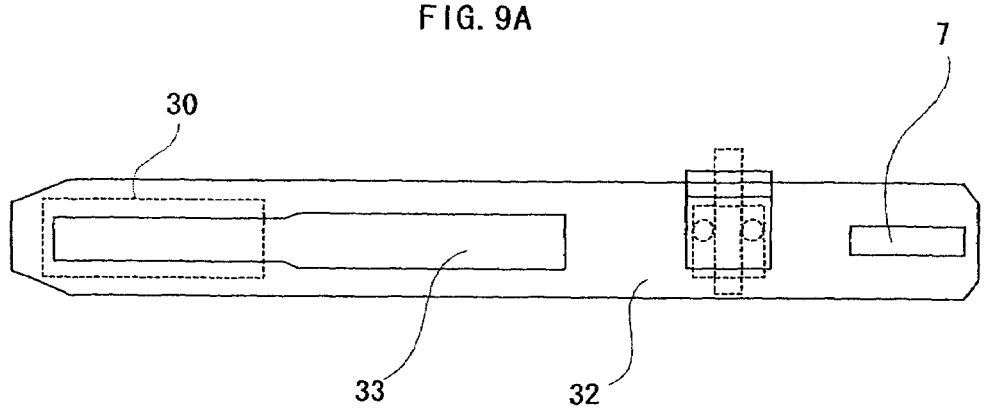
FIG. 9A is a plane view and FIG. 9B is a side view, both showing an example of the third and fourth aspect of the apparatus for cutting a rubber portion of conveyer belt of the present invention.
Figure 9B:
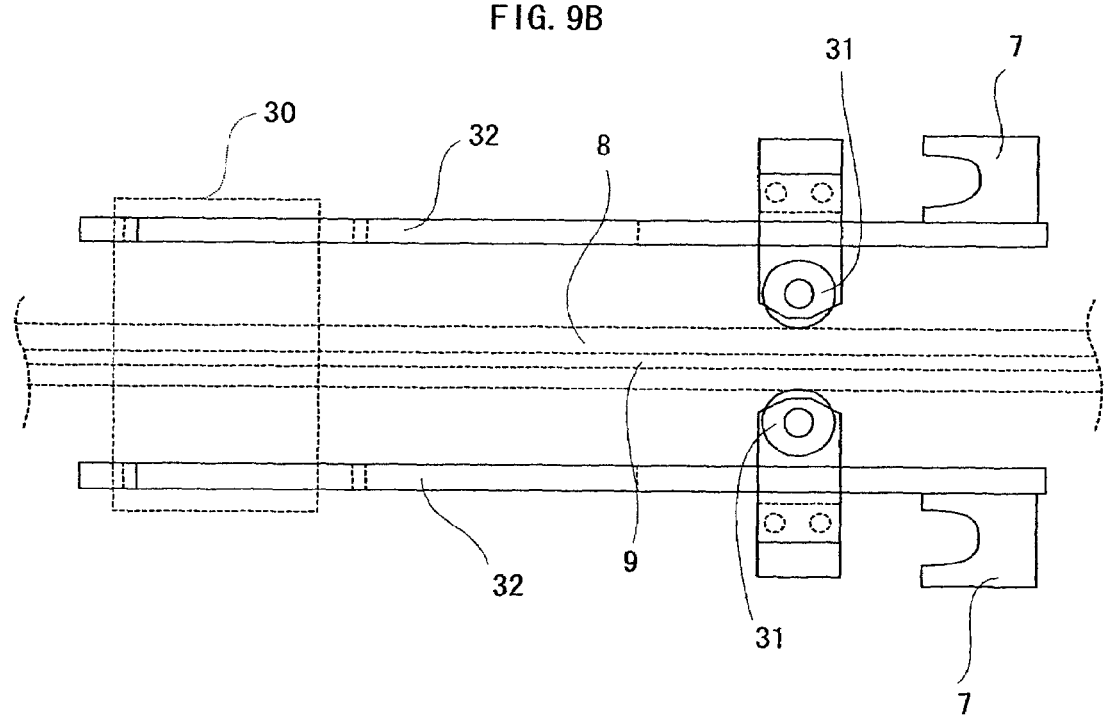

For example, as shown in FIGS. 9A and 9B, the arms "32", "32", are disposed upper side and under side with respect to the conveyer belt as an object to be cut "8". A plurality of movable rollers "31", "31" are disposed to the arms "32", "32", so as to nip the conveyer belt "8" from upper side and under side, and the wedge-shaped cutout portion "33" is also provided to the arms "32", "32", so that the splitting or cutting member "30" can be disposed to the arms.

Although a total number of disposed movable roller "31" is two including upper side and under side in FIGS. 9A and 9B, four rollers can also be disposed at upper side and under side. Moreover, the hooks "7", "7", are disposed at one end of the arms "32", "32", so as to be able to hung a wire, a chain, or the like, though they are not shown in the figure.

The splitting or cutting member "30" disposed at the wedge-shaped cutout portion "33" is not particularly limited, and can be selected according to the purpose. For example, it may suitably be the splitting member "4" of the first aspect, which is dedicated to use of splitting a rubber portion positioned between each steel cords as shown in FIGS. 1A and 1B. It may also suitably be the cutting member "14" of the second aspect, which is dedicated to use of cutting a rubber portion off from the steel cords as shown in FIG. 5. Of these two, it is more beneficial to utilize the cutting member "14" in FIG. 5, from the viewpoint being explained hereinafter.

Figure 10A:
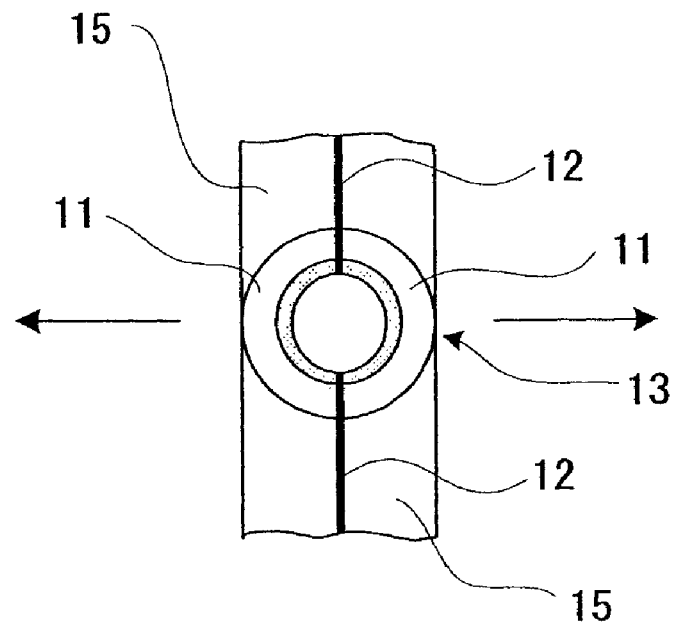
FIG. 10A is an enlarged elevation view of the blade part of the splitting or cutting member shown in FIGS. 9A and 9B during splitting or cutting.
Figure 10B:
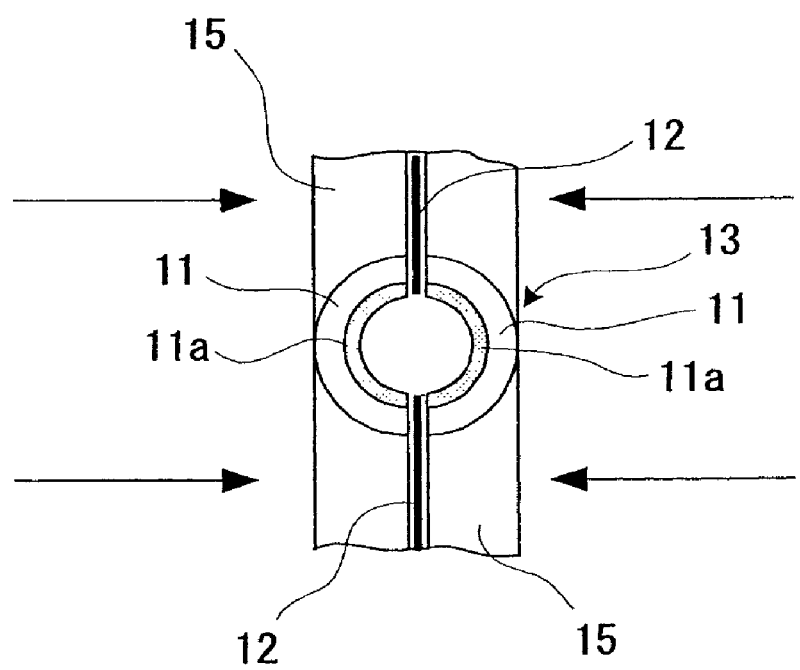
FIG. 10B is an enlarged evaluation view of the blade part of the splitting or cutting member shown in FIGS. 9A and 9B during splitting or cutting operation.

In the case that the cutting member "14" in FIG. 5 is utilized as the cutting member "30" in FIGS. 9A and 9B but without the wedge-shaped cutout portion "33" on the arm "32", the double holder "15", "15", and the cylindrical blade "13" within the cutting member "14" (not shown in the figure) receive a force in the direction shown with the arrow shown in FIG. 10A. Therefore, the end of the cylindrical blade and/or the double holder opens wider by the force, resulted in that diameters of the stripped cylindrical steel cords vary. In the case that the wedge-shaped cutout portion "33" is provided to the arm "32" and the cutting member "14" is disposed at the wedge-shaped cutout portion "33" as shown in FIGS. 9A and 9B, on the other hand, the double holder "15", "15", and the cylindrical blade "13" receive the force in the direction shown with the arrow, by drawbar pull caused from cutting, as shown in FIG. 10B. As a result, the double holder "15", "15", and the cylindrical blade "13" are more tightly fixed and then opening blade edges of the semicylinder blades "11a", "11a", can be prevented. Furthermore, the cutting member "14" is easily replaced from the arms.

According to the third and fourth aspects of the apparatus for cutting a rubber portion of conveyer belt of the present invention, nipping (sandwiching) an object to be cut by a plural of movable rollers, enables the splitting or cutting member to adjust to a sense of the object even which is twisted during cutting, and wear of blade edge can be reduced.

Further, as not showing with a figure, the apparatus for cutting a rubber portion of conveyer belt of the present invention, can suitably be an apparatus in which the splitting members "4" of the first aspect in FIGS. 1A and 1B, and the cutting members "14" of the second aspect in FIG. 5 are alternately disposed.

In this way, the cutting operation can efficiently carried out on a several sheets of conveyer belt at the same time.

The operation method of the apparatus for cutting a rubber portion of conveyer belt described above will be precisely explained hereinafter.

Figure 11:
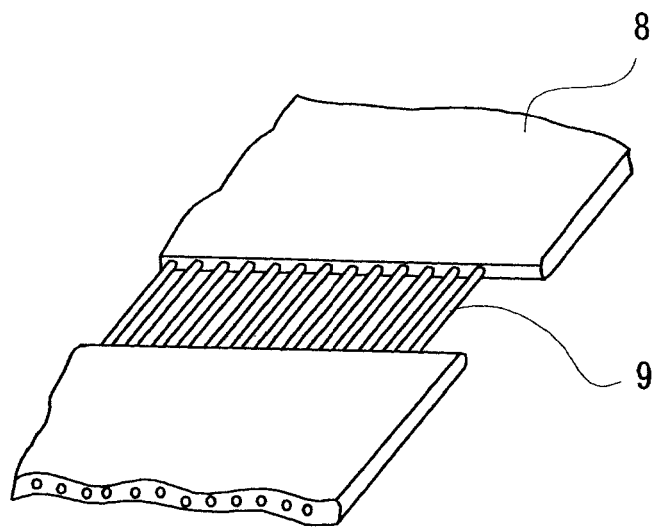
FIG. 11 is a schematic view explaining an example of a method for cutting a rubber portion of conveyer belt of the present invention.

At first, as shown in FIG. 11 with the perspective view, both side of cover rubbers of the conveyer belt "8" is partly cut and removed along the steel cords "9", with a width of 200 mm to 250 mm and at a part where close to a terminal of the conveyer belt, by using a knife. Thereafter, a bonding rubber portion positioned between the steel cords "9" is split by using a knife or an electric heat cutter so that each steel cords "9" are separated and some bonding rubber portion remains around each steel cords. Then, the bonding rubber portion is cut off by using a knife and the steel cords "9" are efficiently strip off as shown in FIG. 10 (pre-treatment).

Figure 12:
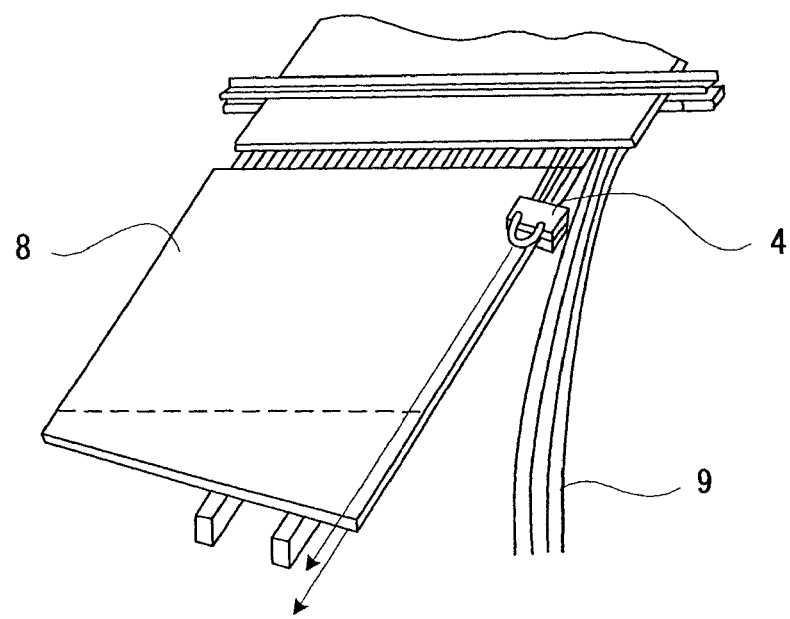
FIG. 12 is a schematic view explaining an example of a method for cutting a rubber portion of conveyer belt of the present invention.

After completing the pre-treatment at a predetermined part of the conveyer belt "8" as describer above, for example, at least one of the splitting member "4" of the first aspect in FIGS. 1A and 1B is placed between the stripped steel cords. A wire or the like is hanged from each hooks "7", "7" of the splitting member, and at least one of the splitting member "4" is sifted towards a terminal of the conveyer belt in course of winding the wire or the like by a winch or the like (FIG. 12).

Figure 13A:
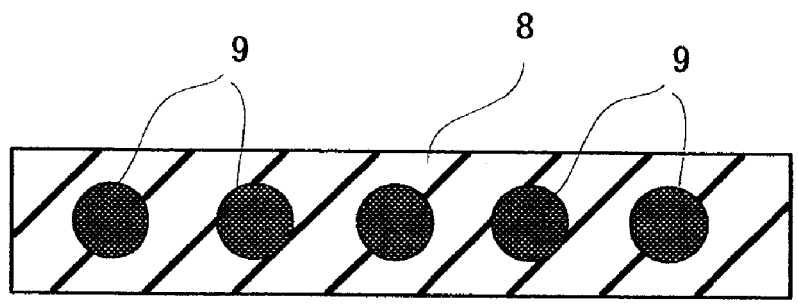
FIG. 13A is a cross-sectional view showing an example of a conveyer belt wherein steel cords are embedded in the cutting operation.
Figure 13B:
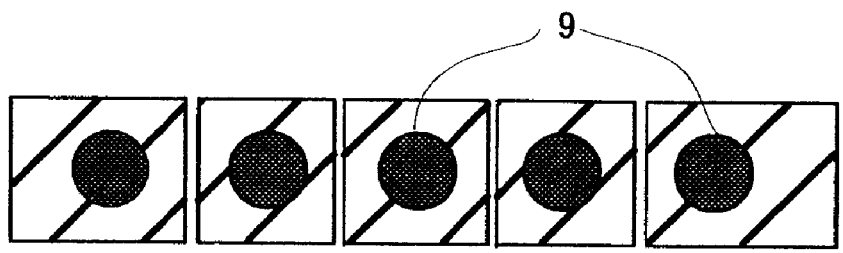
FIG. 13B is a cross-sectional view showing a condition which each steel cords are separated.

Thereafter, as shown in FIG. 13B, the bonding rubber portion positioned between each steel cords "9" is split so as to separate each steel cords, and the cutting member "14" of the second aspect (not shown in the figure) is individually placed to the bonding rubber portion around the separated steel cord. A wire or the like is hanged from each hooks "7", "7" of the cutting member, and at least one of the cutting member "14" is sifted towards a terminal of the conveyer belt in course of winding the wire or the like by a winch or the like. As a result, the bonding rubber portion around the steel cord "9" is cut off.

When the apparatus for cutting a rubber portion of conveyer belt is sifted, the conveyer belt is fixed by clamping using a suitable clamping member.

Figure 13C:
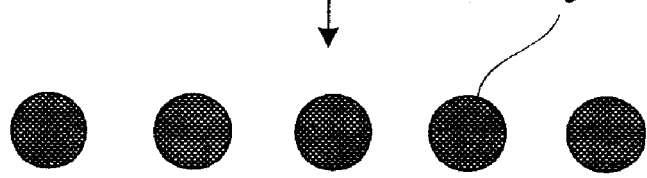
FIG. 13C is a cross-sectional view showing steel cords whose rubber portions attached thereto are cut off.
Figure 14A:
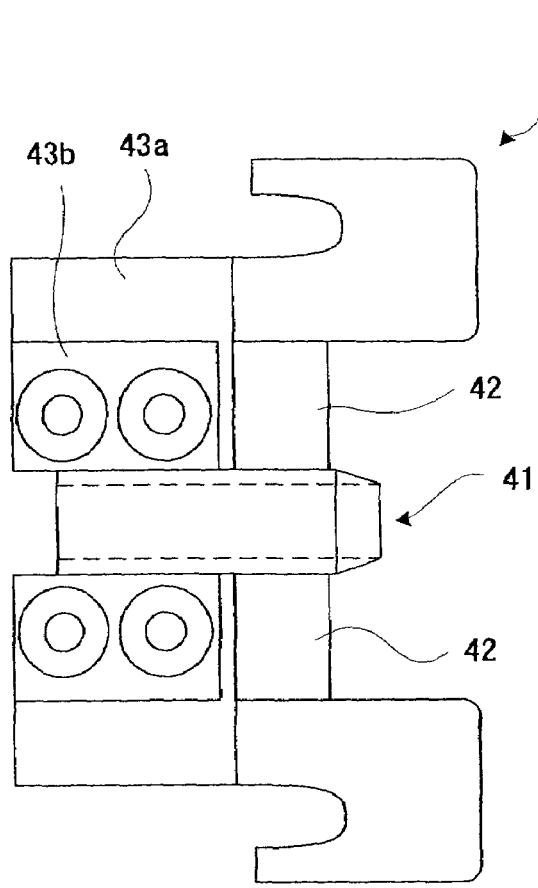
FIG. 14A is a side view showing an example of conventional cutting apparatus for rubber.
Figure 14B:
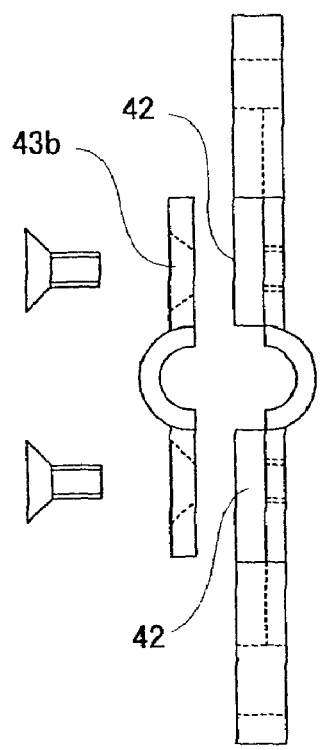
FIG. 14B is an exploded view and FIG. 14C is an enlarged view showing the blade parts thereof.
Figure 14C:
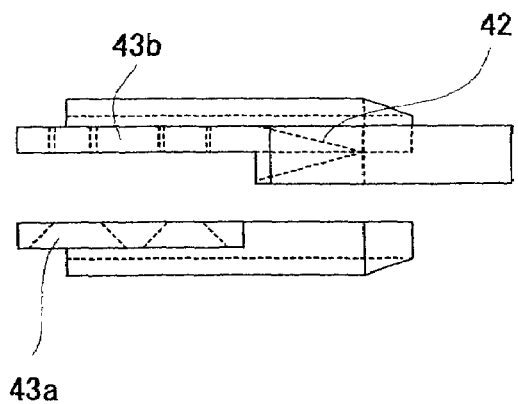

As shown in FIGS. 13A to 13C with the cross-sectional views, step-by step, a rubber portion of a conveyer belt can sufficiently be split and cut off with a minimum man-hour in course of sifting the apparatus for cutting a rubber portion of conveyer belt once. Moreover, a rubber portion of a conveyer belt can completely cut off related to a diameter of the cylindrical blade and length of the straight blades. Specifically, the conveyer belt "8" in FIG. 13A is split and separated to each steel cords embedded in the rubber portion of the conveyer belt by the apparatus for cutting of the first aspect, as shown in FIG. 13B. Thereafter, the rubber portion remained around the separated steel cord is sufficiently cut off by the apparatus for cutting of the second aspect, as shown in FIG. 13C.

In this way, each steel cords "9" are almost completely and uniformly strip off from the conveyer belt "8" at an entire predetermined length, thus an additional cutting operation to each steel cords "9" can be omitted.

The method of sifting the apparatus for cutting is not particularly limited to the example shown with the figure. Another suitable example may be that a rod is hanged from the hook "7", "7", and driving towards a terminal of the conveyer belt by using a reciprocating member such as a screw mechanism, a gear mechanism or a cylinder. In addition, the cutting operation of a rubber portion can be carried out, without a pre-treatment, by using a terminal part of the conveyer belt to be joined with the same procedure of the pre-treatment.

After stripping one or more steel cords as described above at entire length to be joined, all of the steel cords embedded in the conveyer belt can be efficiently stripped by repeating the operation described above.

Although the apparatus and method for cutting a rubber portion of conveyer belt has been precisely disclosed, the present invention is not necessarily limited with the aspects mentioned above, and various modifications can be introduced, provided that impairing the scope of the subject matter of the present invention.

According to the present invention, cutting performance (edge sharpness) is significantly excellent and thin blades can be easily replaced by utilizing commercially available, inexpensive, thin blades. Consequently, even if the blade edge becomes dull, grinding of the blade edge is not necessity. Moreover, utilizing the V-shaped blade prevents an object to cut (conveyer belt) to offset in the vertical direction, hence splitting and cutting can carried out smoothly.

According the present invention, furthermore, two semicylinder blades and a double holder form a non-integral construction. Consequently, maintenance of blades is easy. When the cutting blade is worn, moreover, the semicylinder blades can be replaced with spare semicylinder blades, without replacing the holder, and then the cutting operation can continuously be carried out.

In addition, the present invention has an effect that cutting resistance is reduced and grinding of blade edge can be omitted even an object is a conveyer belt embedded thick, strong steel cords having a diameter of 9 mm to 13 mm. This is realized by splitting the conveyer belt using vertical cut dedicated blade so as to separate each steel cords, and thereafter a cutting operation, which cut off the rubber portion from the separated steel cords, is carried out.

Furthermore, nipping by a plurality of movable rollers can adjust a splitting or cutting member to the twisted or curved conveyer belt during splitting or cutting. As a result, wearing of blade edge at an early stage can be reduced.

Since a wedge-shaped cutout portion is provided to an arm in the present invention, the double holder and the blade are fixed more tightly with drawbar pull. Therefore the cutting operation is carried out with a constant results, i.e., uniform diameters of the resulted cylinder forms of the stripped steel cords. Moreover, the cutting member is easily replaced from the apparatus, thus it is very convenient for maintenance.

Furthermore, the present invention prevents blade edges from chipping or breaking which results from touching with steel cords, and ensures smooth splitting and cutting of a rubber portion. Frequent grinding or replacement of blade, or the like can be omitted and surface strands of each steel cords can be sufficiently protected from damages.

To sum up, the present invention provides an apparatus and method for cutting a rubber portion of conveyer belt, which are suitable for cutting a rubber portion positioned between each steel cords embedded in the rubber portion of conveyer belt so as to separate each steel cords, and removing the rubber portion remained around the separated steel cords completely and uniformly from each steel cords at predetermined length.

The invention claimed is:

1. An apparatus for cutting a rubber portion of a conveyer belt comprising:
    a splitting member having a triple blade consisting of: a V-shaped thin blade which is configured to cut; and a V-shaped double holder blade configured to cut together with the V-shaped thin blade, in which the V-shaped thin blade is disposed within the V-shaped double holder blade so as to protrude from the V-shaped double holder blade,
    wherein the V-shaped double holder blade includes cutting edges configured to cut,
    wherein edges of the V-shaped thin blade and the V-shaped double holder blade form a V-shape where the V-shape forms two angles and the smaller angle among the formed two angles faces a direction for movement,
    wherein the apparatus for cutting is used for splitting a rubber portion of a conveyer belt so as to separate each steel cords embedded in the conveyer belt, and cutting the rubber portion off from the separated steel cords so as to strip the steel cords, where the splitting member is used for splitting the rubber portion,
    wherein the triple blade is mounted from both side edges of the V-shaped double holder blade by mounting members having hooks provided at an end; and
    wherein the V-shaped thin blade is replaceable from the V-shaped double holder blade.

2. An apparatus for cutting a rubber portion of a conveyer belt according to claim 1, wherein a blade edge of the V-shaped thin blade protrudes from a blade edge of the V-shaped double holder blade at 3 mm or longer.

3. An apparatus for cutting a rubber portion of a conveyer belt according to claim 1, wherein a total included angle of the triple blade is within a range of 50° to 70°.

4. An apparatus for cutting a rubber portion of a conveyer belt according to claim 1, wherein an angle of the V-shaped thin blade is within a range of 110° to 130°.

* * * * *